(12) United States Patent
Lau

(10) Patent No.: US 8,584,695 B2
(45) Date of Patent: Nov. 19, 2013

(54) AIR VALVE FOR INFLATABLE DEVICE

(75) Inventor: Vincent W. S. Lau, Sai Kung (HK)

(73) Assignee: Ideal Time Consultants Limited (VG)

( * ) Notice: Subject to any disclaimer, the term of this patent is extended or adjusted under 35 U.S.C. 154(b) by 356 days.

(21) Appl. No.: 12/905,399

(22) Filed: Oct. 15, 2010

(65) Prior Publication Data

US 2012/0090699 A1   Apr. 19, 2012

(51) Int. Cl.
*F16K 15/20* (2006.01)

(52) U.S. Cl.
USPC .............. 137/232; 441/41; 441/90; 446/224

(58) Field of Classification Search
USPC .............. 137/231, 223, 232, 316, 800, 854; 446/222, 224; 441/40, 41, 90–101; 251/90; 222/543; 138/89.1–89.4, 96 R, 138/89; 410/119; 215/306, 315, 235; 220/375, 837, 839
See application file for complete search history.

(56) References Cited

U.S. PATENT DOCUMENTS

| | | | | |
|---|---|---|---|---|
| 3,016,168 A * | 1/1962 | Larson | ......................... | 222/543 |
| 3,127,064 A * | 3/1964 | Fairchild | ....................... | 220/837 |
| 3,239,096 A * | 3/1966 | Buono et al. | ................... | 220/832 |
| 3,306,483 A * | 2/1967 | Bellafiore | ....................... | 215/306 |
| 3,974,938 A * | 8/1976 | Steadman | ....................... | 215/306 |
| 4,132,225 A * | 1/1979 | Whattam | ....................... | 215/306 |
| 4,327,842 A * | 5/1982 | Walter | ........................... | 222/543 |
| 4,823,831 A * | 4/1989 | Jaw | ............................... | 137/223 |
| 4,924,899 A | 5/1990 | Po | | |
| 5,083,581 A * | 1/1992 | Jaw | ............................... | 137/223 |
| 5,090,583 A * | 2/1992 | Hoffman et al. | ............... | 215/306 |
| 5,111,838 A * | 5/1992 | Langston | ........................ | 137/223 |
| 5,119,842 A | 6/1992 | Jaw | | |
| 5,203,831 A * | 4/1993 | Lind et al. | ....................... | 137/223 |
| 5,271,519 A * | 12/1993 | Adams et al. | .................. | 220/375 |
| 5,295,599 A * | 3/1994 | Smith | ............................ | 215/306 |
| 5,351,711 A * | 10/1994 | Peter | ............................. | 137/232 |
| 6,138,711 A * | 10/2000 | Lung-Po | ......................... | 137/223 |
| 6,164,314 A | 12/2000 | Saputo et al. | | |
| 6,196,254 B1 | 3/2001 | Shaw | | |
| 6,296,254 B1 | 10/2001 | Young | | |
| 6,460,560 B1 * | 10/2002 | Weinheimer et al. | .......... | 137/232 |
| 6,648,004 B2 | 11/2003 | Lau | | |
| 6,684,004 B1 | 1/2004 | Tomita | | |
| 6,814,639 B1 | 11/2004 | Peterson | | |
| 7,387,216 B1 * | 6/2008 | Smith | ........................... | 220/229 |
| 2004/0163707 A1 * | 8/2004 | Reeb et al. | ...................... | 137/223 |
| 2005/0109398 A1 * | 5/2005 | Huang | ............................ | 137/223 |
| 2008/0223449 A1 * | 9/2008 | Culp et al. | ..................... | 137/232 |

* cited by examiner

*Primary Examiner* — Craig Schneider
*Assistant Examiner* — Craig J Price
(74) *Attorney, Agent, or Firm* — St. Onge Steward Johnston & Reens LLC

(57) ABSTRACT

A housing has an upper end, a lower end, and an opening extending between the upper and lower ends, the housing being sealingly attachable to an inflatable device. A check valve has a body member with an upper end, a lower end, an outer surface sized and shaped to be selectively matingly received in the opening of the housing, and an inner surface defining a passageway. The check valve is coupled to the housing by a first tether. A cap has an upper end, a lower end, and an outer surface sized and shaped to be selectively matingly received in the passageway of the check valve. The cap is coupled to the housing by a second tether.

22 Claims, 6 Drawing Sheets

AIR VALVE FOR INFLATABLE DEVICE

FIELD OF THE INVENTION

The apparatus described herein is generally directed to the field of valves; and, more directly, to the field of air valves for inflatable devices.

BACKGROUND OF THE INVENTION

The use of inflatable devices has long been associated with water sports and recreational activities involving water. For the most part, this has been the case because inflatable devices are generally capable of floating on water. With the explosion of the availability of inexpensive plastic products, recreational devices such as beach balls and water wings became increasingly common at pools and beaches during the latter half of the 20$^{th}$ century.

Inflatable devices have also been used for more sophisticated recreational purposes. For example, inner tubes have traditionally been used as a simple watercraft. Inner tubes float in water, even with a rider in place, and provide a relatively ergonomic shape to secure the rider comfortably. They are also sufficiently durable for this use. Inner tubes can be used to float in a calm body of water, or they can be used as passive vehicles in a flowing body of water, such as a river. Inner tubes can also be towed behind powered watercraft. These activities are known as "tubing."

Inner tubes are well suited for water recreation, especially given that they were not designed for this use. However, they have several drawbacks, which in part result from being used outside of their design specifications. One major drawback is that they are designed to be inflated at a high pressure. This means that a high pressure pump must be used to inflate them. This also means that it takes a relatively long time to inflate and deflate inner tubes. There is also a risk of violent rupture because of the high potential energy of a high pressure reservoir. Such an event could cause human injury or property damage.

As a result, there has been a move to produce simple watercraft and other water recreation devices from PVC instead of rubber, as in an inner tube. Watercraft and devices in this newer wave tend to be low pressure inflatables. They also incorporate design improvements in ergonomics and maneuverability for recreational use.

Despite being inflated to a low pressure, these devices often have a substantial volume of inflatable space. This makes fast and easy inflation and deflation an engineering challenge. Most of the design work that goes in to addressing this challenge is focused on the air valves for these devices. The valves must be able to accommodate a large flow volume for both inflation and deflation. They must be air tight when closed, even during hard use or stressful conditions. Furthermore, they must accommodate inflation from sources not capable of producing high inflation pressures. Thus, there remains a need in the art for air valves for inflatable devices that meet these design requirements.

SUMMARY OF THE INVENTION

A housing has an upper end, a lower end, and an opening extending between the upper and lower ends, the housing being sealingly attachable to an inflatable device. A check valve has a body member with an upper end, a lower end, an outer surface sized and shaped to be selectively matingly received in the opening of the housing, and an inner surface defining a passageway. The check valve is coupled to the housing by a first tether. A cap has an upper end, a lower end, and an outer surface sized and shaped to be selectively matingly received in the passageway of the check valve. The cap is coupled to the housing by a second tether.

DETAILED DESCRIPTION OF THE INVENTION

Figure 1:
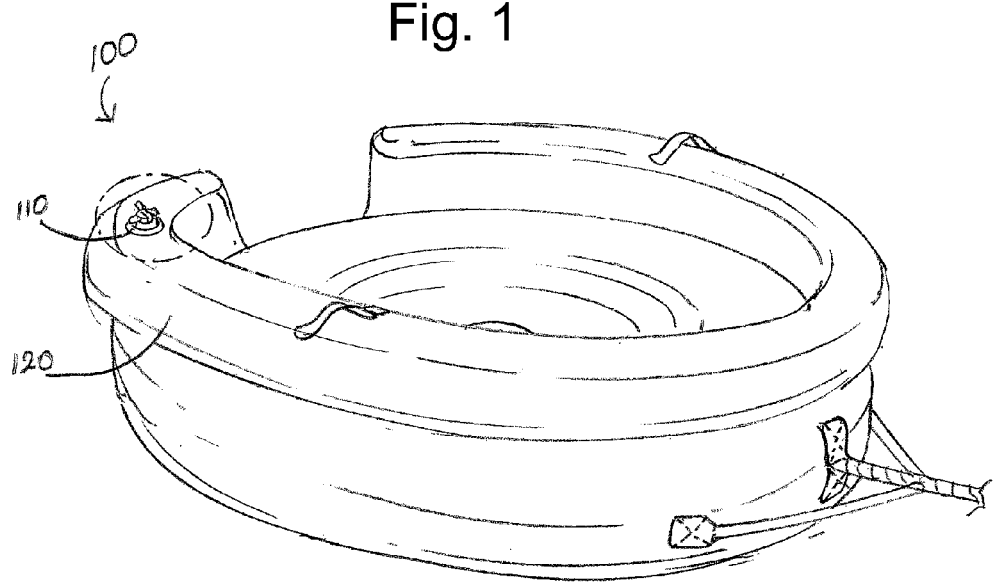
FIG. 1 is an inflatable device incorporating one embodiment of the air valve.
Figure 2:
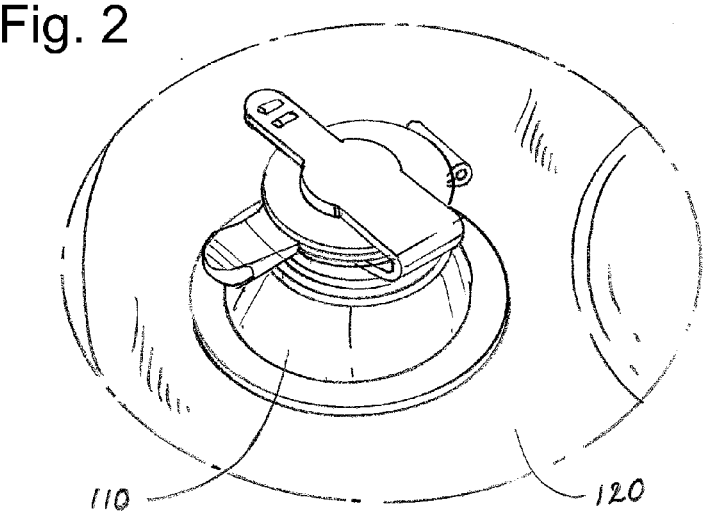
FIG. 2 is blown-up view of the air valve shown in FIG. 1.

FIG. 1 is an inflatable device 100 incorporating one embodiment of the air valve 110. Inflatable device 100 may be a watercraft, floating lounge, air mattress, inflatable pool, or a variety of other devices. Inflatable device 100 comprises an air reservoir 120, which typically must be filled with air at or above the pressure in the surrounding environment to perform some intended function. Air valve 110 is the device that enables inflation and deflation of inflatable device 100. Air is transferred to and from air reservoir 120 through air valve 110. Air valve 110 must provide a passageway for delivery of air, but must also be capable of retaining air within air reservoir 120 at pressure when inflation is complete. One advantage of an inflatable device having an air valve over an inflated device not having an air valve (such as a balloon) is that an inflatable device can be "topped off" or re-inflated to the maximum pressure if the relative pressure subsides due to leakage, distention of the air reservoir, or a decrease in atmospheric pressure (due to weather or altitude changes, for example). Another advantage is that inflatable device 100 is also capable of being deflated for easy transport and storage. The presence of air valve 110 on inflatable device 100 makes inflatable device 100 capable of being re-inflated or "topped off" and deflated. FIG. 2 is blown-up view of air valve 110 shown in FIG. 1.

Figure 3:
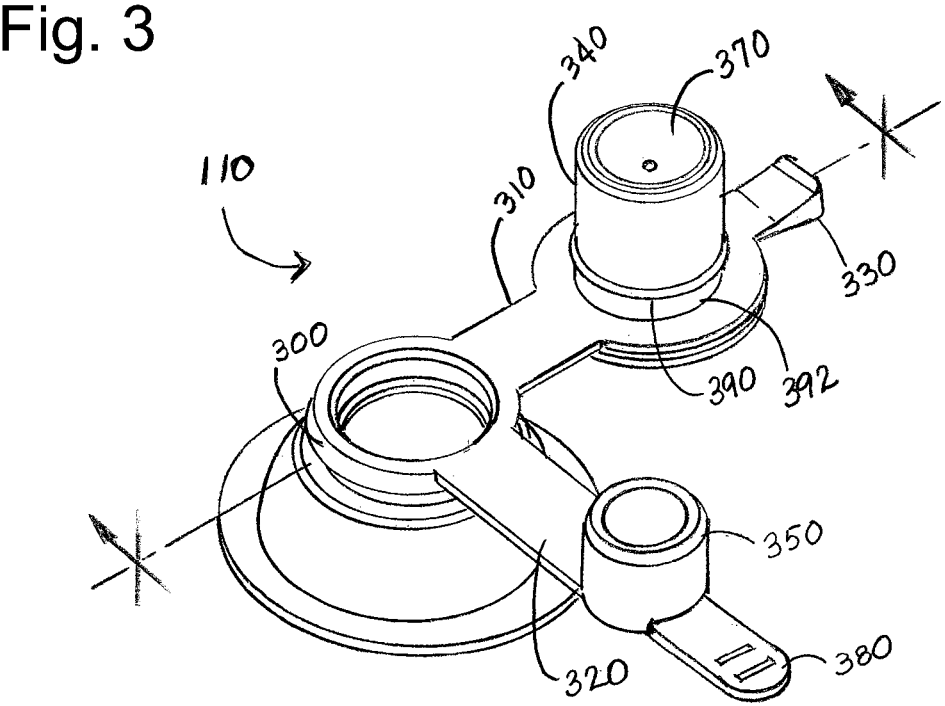
FIG. 3 is a perspective view of the embodiment of the air valve shown in FIG. 2 in a fully opened position.

FIG. 3 is a perspective view of the embodiment of air valve 110 shown in FIG. 2 in a fully opened position. Air valve 110 comprises housing 300. Housing 300 comprises opening 410. A check valve 340 is coupled to housing 300 via a first tether 310. A cap 350 is coupled to housing 300 via a second tether 320. In this embodiment, second tether 320 is coupled to housing 300 at a 90 degree angle with respect to first tether 310. In other embodiments, second tether 320 is coupled to housing 300 at any angle with respect to first tether 310.

First pull tab 330 is on an outward end of first tether 310, with check valve 340 intermediate first pull tab 330 and housing 300. First pull tab 330 and first tether 310 are one continuous piece having a first hole 392. First hole 392 couples check valve 340 to first tether 310. First tether 310 is coupled to an inward end of check valve 340 and first pull tab 330 is coupled to an outward end of check valve 340. In one embodiment, check valve 340 has a first annular groove on its upper end. The first annular groove in that embodiment is arranged to couple check valve 340 to first tether 310. The first annular groove has an inner diameter that is the same as the diameter of first hole 392. In that embodiment, first hole 392 has a smaller diameter than the outer surface of check valve 340. This allows a secure coupling of check valve 340 to first tether 310. Second pull tab 380 is on an outward end of second tether 320, with cap 350 intermediate second pull tab 380 and housing 300. Second pull tab 380, second tether 320, and cap 350 are made from a single continuous piece.

Figure 4:
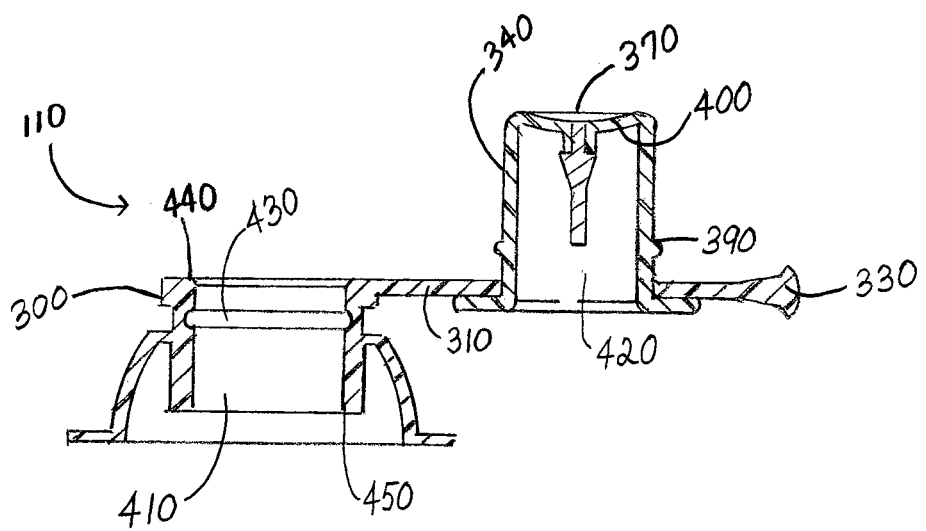
FIG. 4 is a cross-section of the embodiment shown in FIG. 2 in a fully opened position.

FIG. 4 is a cross-section of the embodiment shown in FIG. 2 in a fully opened position. In the illustrated embodiments, check valve 340 is a boston valve. A boston valve comprises a perforated plate 400 with an abutting flexible disc 370. Flexible disc 370 is on the reservoir side and the perforated plate 400 is on the atmospheric or external side. During inflation, the pressure is greater on the outer side than the reservoir side. The pressure differential induces a flow through perforated plate 400. This flow is only resisted by the rigidity of flexible disc 370, which is small. Therefore, the air flow easily deforms flexible disc 370 such that it no longer obstructs the perforations in perforated plate 400. Air then flows from the high pressure outer side to the low pressure reservoir 120 with relatively little resistance. When an external pressure source is removed, reservoir 120 will be at a higher pressure than the atmosphere or the outside of check valve 340. In this condition, the flow is reversed and flexible disc 370 is deformed, however it is deformed towards the perforations instead of away from them. Therefore, the high pressure air forces flexible disc 370 to cover the perforations, preventing the flow of air. Thus the boston valve is a one-directional valve comprising flexible disc 370 which is arranged to selective engage perforated plate 400 when pressure within inflatable device 100 exceeds pressure on the outside of inflatable device 100. Other embodiments may not use a boston valve, and may use some other type of valve.

Check valve 340 includes annular rim 390 which is adapted to mate with a second annular groove 430 when check valve 340 is inserted into opening 410. This ensures that the fit between check valve 340 and opening 410 is secure and air-tight. Housing 300 comprises an upper end 440 and a lower end 450. In one embodiment, lower end 450 is sealingly attached to inflatable device 100.

Figure 5:
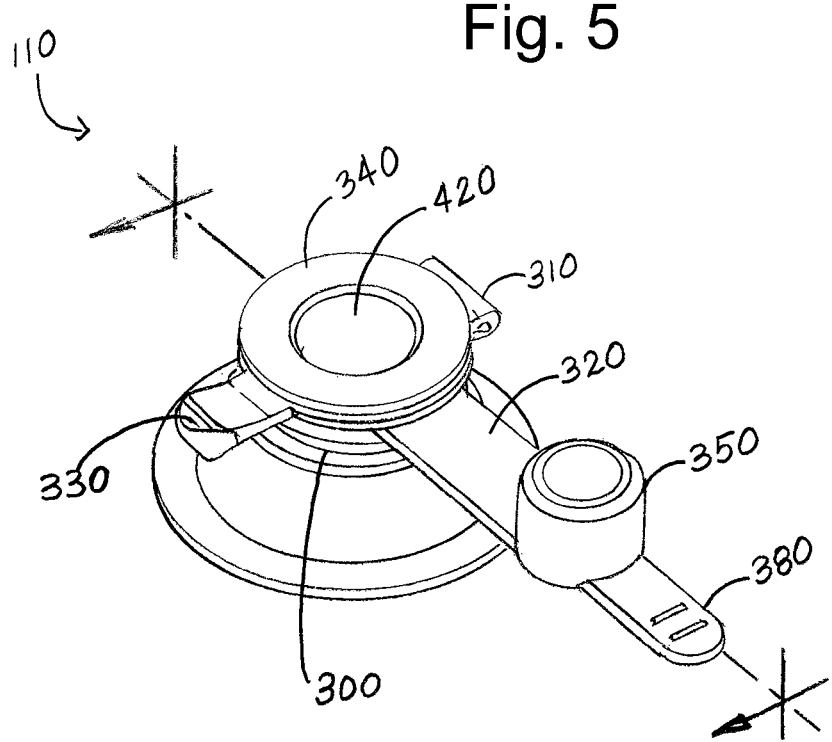
FIG. 5 is a perspective view of the embodiment shown in FIG. 2 in a partially opened position.
Figure 6:
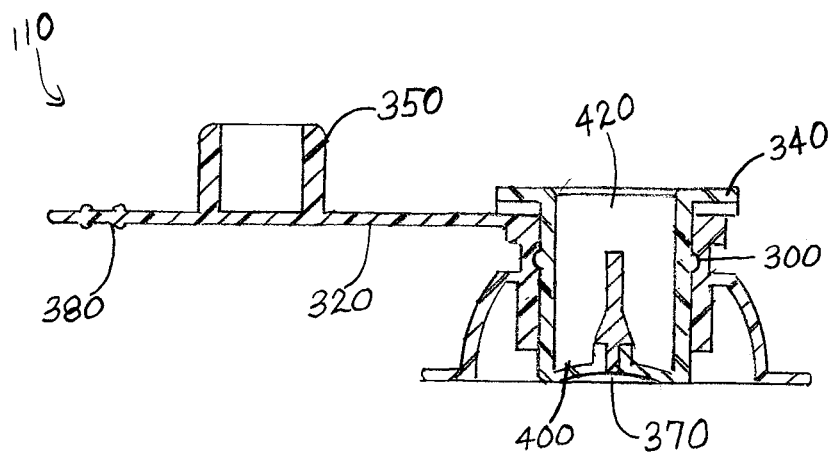
FIG. 6 is a cross-section of the embodiment shown in FIG. 2 in a partially opened position.
Figure 7:
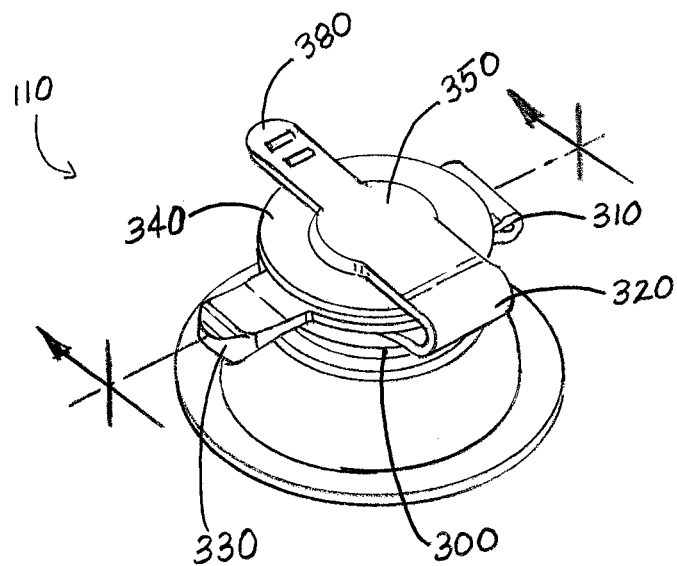
FIG. 7 is a perspective view of the embodiment shown in FIG. 2 in a closed position.
Figure 8:
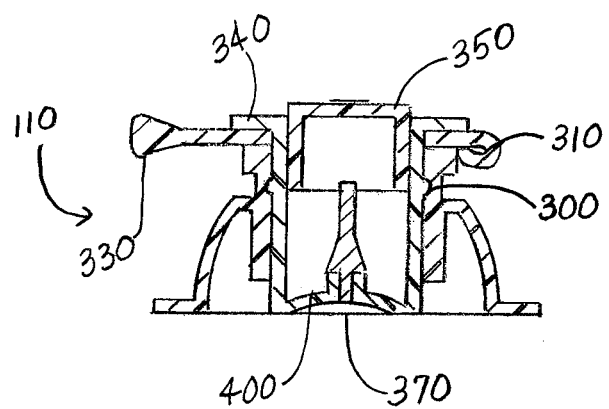
FIG. 8 is a cross-section of the embodiment shown in FIG. 2 in a closed position.

FIG. 5 is a perspective view of the embodiment shown in FIG. 2 in a partially opened position. FIG. 6 is a cross-section of the embodiment shown in FIG. 2 in a partially opened position. FIG. 7 is a perspective view of the embodiment shown in FIG. 2 in a closed position. FIG. 8 is a cross-section of the embodiment shown in FIG. 2 in a closed position. In this embodiment, second tether 320 is coupled to housing 300 at a 90 degree angle with respect to first tether 310 as viewed from above air valve 110 as if looking through air valve 110 into inflatable device 100.

To inflate reservoir 120, a user folds first tether 310 and inserts check valve 340 into opening 410 in housing 300 as shown in FIG. 5. The user then inflates the reservoir through check valve 340 either using human lung power or a mechanical pump. When a user has inflated inflatable device 100 to desired volume or pressure, the user removes the source of pressurized air. As discussed above, check valve 340 prevents the escape of air from reservoir 120 in this condition. The user then folds second tether 320 and places cap 350 into passageway 420 in check valve 340 to fully close air valve 110 as shown in FIG. 7. This prevents debris or fluids from entering check valve 340, or inadvertent opening of check valve 340, or damage to check valve 340. Cap 350 also provides an extra barrier to the escape of air from reservoir 120. In this final position, air valve 110 is in a closed position and inflatable device 100 is ready for use. A user may top off the pressure in inflatable device 100 or access check valve 340 for some other reason by removing cap 350 from passageway 420 and leaving check valve 340 in place (i.e. the partially opened position) as shown in FIG. 5. It is easy for a user to remove or insert cap 350 without disturbing check valve 340 or inadvertently deflating air reservoir 120 because the two parts are independently tethered to housing 300.

In order to deflate air reservoir 120, a user first removes cap 350 from passageway 420 by pulling second pull tab 380. Second, the user removes check valve 340 from opening 410 by pulling first pull tab 330. This allows air to escape through opening 410 in housing 300, which is a relatively short passageway with a relatively large diameter. Thus, air encounters little resistance as it escapes from the reservoir. As a result, opening 410 facilitates rapid deflation of inflatable device 100, which is advantageous to a user.

Figure 9A:
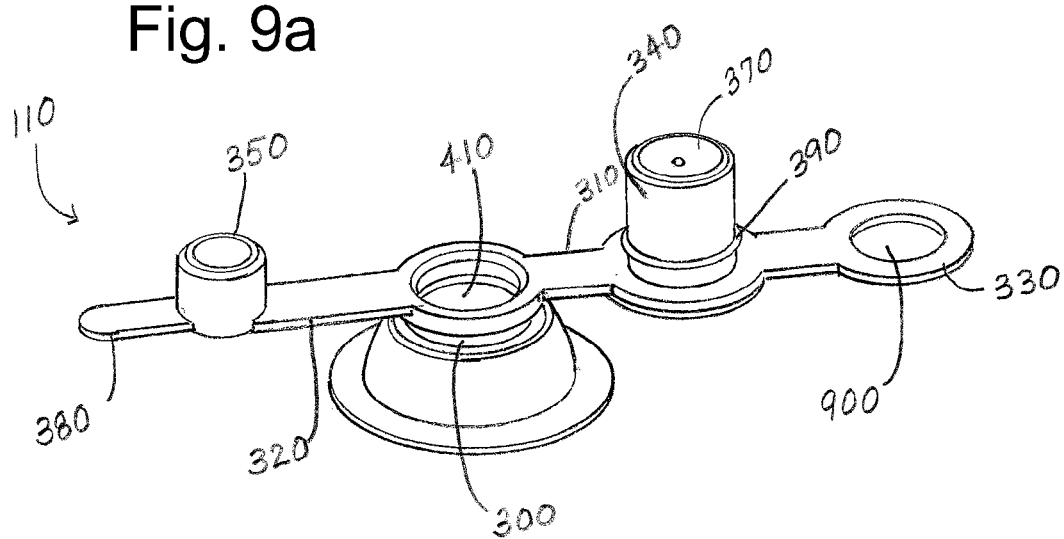
FIG. 9a is a perspective view of a second embodiment of the air valve in a fully opened position.
Figure 9B:
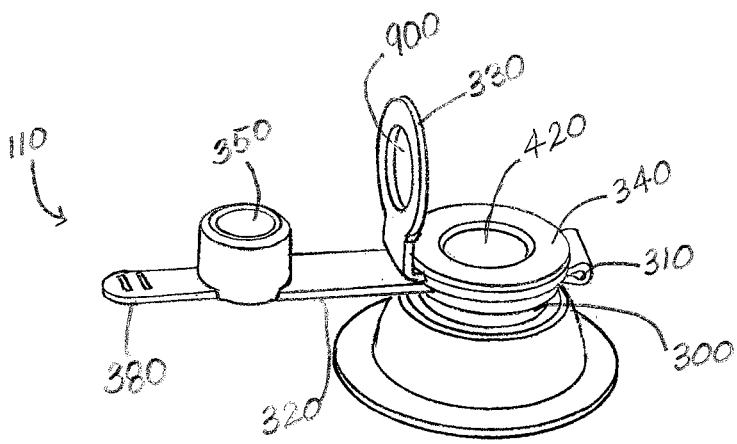
FIG. 9b is a perspective view of the embodiment shown in FIG. 9a in a partially opened position.
Figure 9C:
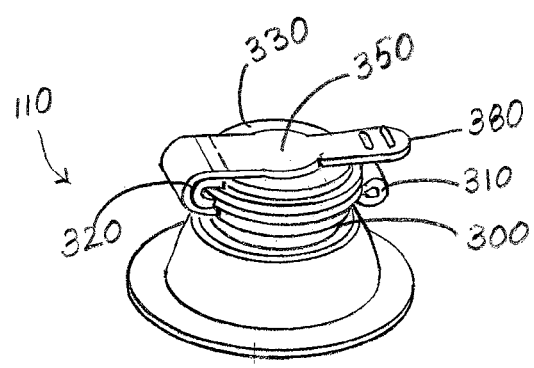
FIG. 9c is a perspective view of the embodiment shown in FIG. 9a in a closed position.

FIG. 9a is a perspective view of a second embodiment of the air valve in a fully opened position. FIG. 9b is a perspective view of the embodiment shown in FIG. 9a in a partially opened position. FIG. 9c is a perspective view of the embodiment shown in FIG. 9a in a closed position. First tether 310 and second tether 320 may be coupled to opposite sides of housing 300. When air valve 110 is in a closed position, first pull tab 330 is adapted to fit between, on one side, check valve 340 and, on the other side, second tether 320 and second pull tab 380. First pull tab 330 is sufficiently thin to fit in between these parts in a closed position. First pull tab 330 is also shaped so as to fit into air valve 110 in a streamlined manner when air valve 110 is in a closed position. In this embodiment, first pull tab 330 is a flattened ring and surrounds cap 350 in a closed position of air valve 110. First pull tab 330 can be any shape that is ergonomic to pull and can fit between cap 350 and check valve 340 in a closed position.

First pull tab 330 has a second hole 900 which is shaped to allow cap 350 to be inserted through second hole 900 before being inserted into passageway 420. In order to close this embodiment of air valve 110, a user must fold over first pull tab 330, insert cap 350 through second hole 900, and insert cap 350 into passageway 420. In one embodiment, second hole 900 is the same shape as the cross-section of cap 350 or sized and shaped to closely receive cap 350. Once in a closed position, first pull tab 330 is held securely in place by second tether 320 and second pull tab 380.

Figure 10A:
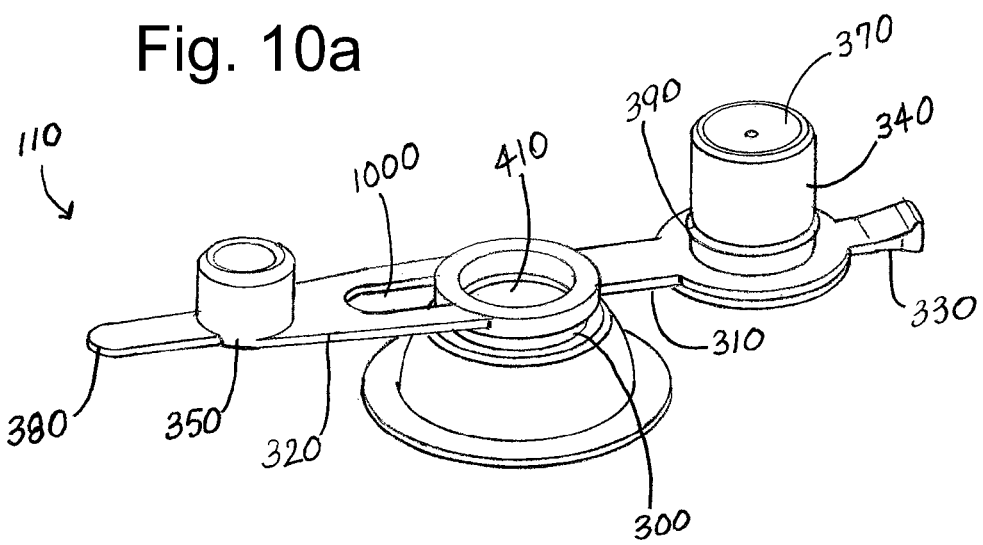
FIG. 10a is a perspective view of a third embodiment of the air valve in a fully opened position.
Figure 10B:
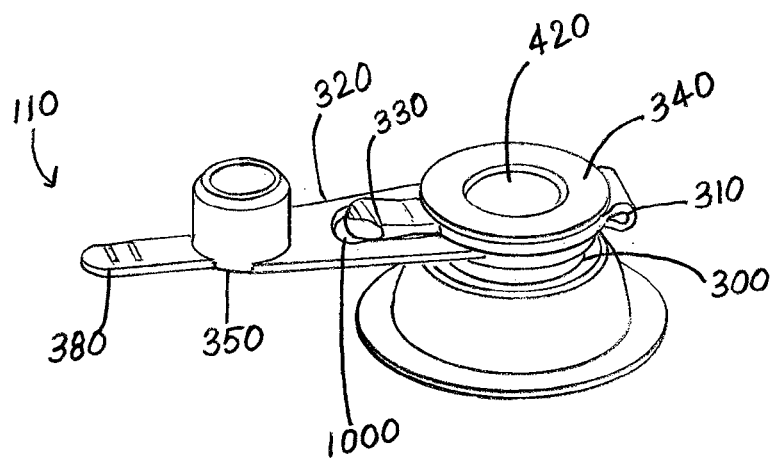
FIG. 10b is a perspective view of the embodiment shown in FIG. 10a in a partially opened position.
Figure 10C:
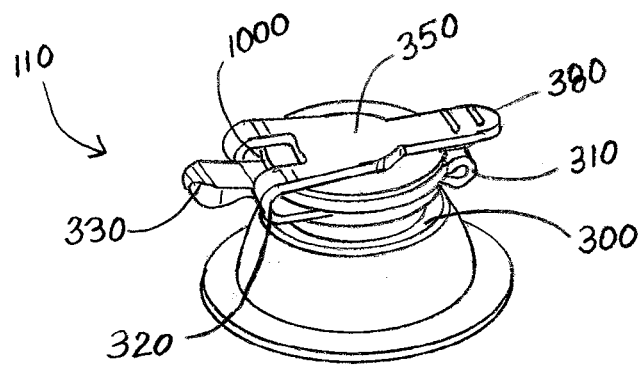
FIG. 10c is a perspective view of the embodiment shown in FIG. 10a in a closed position.

FIG. 10a is a perspective view of a third embodiment of the air valve in a fully opened position. FIG. 10b is a perspective view of the embodiment shown in FIG. 10a in a partially opened position. FIG. 10c is a perspective view of the embodiment shown in FIG. 10a in a closed position. In this embodiment, first tether 310 and second tether 320 are coupled to opposite sides of housing 300. In this embodiment, second tether 320 comprises orifice 1000 adjacent to housing 300. Orifice 1000 provides clearance for first pull tab 330, so that in a closed position of air valve 110, first pull tab 330 protrudes from orifice 1000. First pull tab 330 can be any shape that is ergonomic to pull and does not interfere with second tether 320 in a closed position.

Although the invention has been described with reference to embodiments herein, those embodiments do not limit the scope of the invention. Modification to those embodiments or different embodiments may fall within the scope of the invention.

What is claimed is:

1. An air valve for an inflatable device, comprising:
a housing having an upper end, a lower end, and an opening extending between the upper and lower ends, the housing being sealingly attachable to the inflatable device;
a check valve having a body member with an upper end, a lower end, an outer surface sized and shaped to be selectively matingly received in the opening of the housing, and an inner surface defining a passageway, and the check valve being coupled to the housing by a first tether;
a cap having an upper end, a lower end, and an outer surface sized and shaped to be selectively matingly received in the passageway of the check valve, and the cap being coupled to the housing by a second tether;
the first tether being coupled to the housing independently of the second tether;
a first pull tab on an outward end of the first tether, and the check valve being coupled to the tether intermediate the first pull tab and the housing; and
the first pull tab having a hole sized and shaped to closely receive the cap therethrough.

2. The air valve of claim 1, wherein, in a closed position of the air valve, the first pull tab is disposed between an uppermost end of the check valve and the second tether, and the first pull tab closely surrounds the cap.

3. The air valve of claim 2, wherein the first pull tab comprises a ring which closely surrounds the cap in the closed position.

4. The air valve of claim 1, wherein the first tether and second tether are coupled to opposite sides of the housing.

5. The air valve of claim 1, wherein the second tether is coupled to the housing at a 90 degree angle with respect to the first tether.

6. The air valve of claim 2, further comprising:
a second pull tab, the second pull tab being on an outward end of the second tether, and the cap being coupled to the second tether intermediate the second pull tab and the housing; and
in the closed position of the air valve, the first pull tab being disposed between an uppermost end of the check valve and the second pull tab.

7. The air valve of claim 1, wherein the check valve comprises a perforated plate and a flexible disc arranged to selectively engage the plate when pressure within the inflatable device exceeds pressure on the outside of the inflatable device.

8. An air valve for an inflatable device, comprising:
a housing having an upper end, a lower end, and an opening extending between the upper and lower ends, the housing being sealingly attachable to the inflatable device;
a check valve having a body member with an upper end, a lower end, an outer surface sized and shaped to be selectively matingly received in the opening of the housing, and an inner surface defining a passageway, and the check valve being coupled to the housing by a first tether;
a cap having an upper end, a lower end, and an outer surface sized and shaped to be selectively matingly received in the passageway of the check valve, and the cap being coupled to the housing by a second tether;
the first tether being coupled to the housing independently of the second tether and the first and second tethers being coupled to opposite sides of the housing;
a first pull tab on an outward end of the first tether, and the check valve being coupled to the first tether intermediate the first pull tab and the housing; and
the first pull tab having a hole sized and shaped to closely receive the cap therethrough.

9. The air valve of claim 8, further comprising, in a closed position of the air valve, the first pull tab being disposed between an uppermost end of the check valve and the second tether, and the first pull tab closely surrounds the cap.

10. The air valve of claim 9, wherein the first pull tab comprises a ring which closely surrounds the cap in the closed position.

11. The air valve of claim 9, further comprising:
a second pull tab, the second pull tab being on an outward end of the second tether, and the cap being coupled to the second tether intermediate the second tab and the housing; and
in the closed position of the air valve, the first pull tab being disposed between an uppermost end of the check valve and the second pull tab.

12. The air valve of claim 8, wherein the check valve comprises a perforated plate and a flexible disc arrange to selectively engage the plate when pressure within the inflatable device exceeds pressure on the outside of the inflatable device.

13. An inflatable device, comprising:
an air reservoir;
an air valve sealingly attached to the inflatable device and coupling the air reservoir to a surrounding atmosphere, the air valve comprising:
a housing having an upper end, a lower end, and an opening extending between the upper and lower ends;
a check valve having a body member with an upper end, a lower end, an outer surface sized and shaped to be selectively matingly received in the opening of the housing, and an inner surface defining a passageway, and the check valve being coupled to the housing by a first tether;
a cap having an upper end, a lower end, and an outer surface sized and shaped to be selectively matingly received in the passageway of the check valve, and the cap being coupled to the housing by a second tether;
the first tether being coupled to the housing independently of the second tether;
a first pull tab on an outward end of the first tether, and the check valve being coupled to the first tether intermediate the first pull tab and the housing; and
the first pull tab having a hole sized and shaped to closely receive the cap therethrough.

14. The inflatable device of claim 13, further comprising, in a dosed position of the air valve, the first pull tab is disposed between an uppermost end of the check valve and the second tether, and the first pull tab closely surrounds the cap.

15. The inflatable device of claim 14, wherein the first pull tab comprises a rind which closely surrounds the cap in the closed position.

16. The inflatable device of claim 13, wherein the first tether and second tether are coupled to opposite sides of the housing.

17. The inflatable device of claim 13, wherein the second tether is coupled to the housing at a 90 degree angle with respect to the first tether.

18. The inflatable device of claim 14, wherein the air valve further comprises a second pull tab, the second pull tab being on an outward end of the second tether, and the cap being coupled to the second tether intermediate the second pull tab and the housing; and in the closed position of the air valve, the first pull tab is disposed between an uppermost end of the check valve and the second pull tab.

19. The inflatable device of claim 13, wherein the check valve comprises a perforated plate and a flexible disc arranged to selectively engage the plate when pressure within the air reservoir exceeds pressure in the surrounding atmosphere.

20. An air valve for an inflatable device, comprising:
a housing having an upper end, a lower end, and an opening extending between the upper and lower ends, the housing being sealingly attachable to the inflatable device;
a check valve having a body member with an upper end, a lower end, an outer surface sized and shaped to be selectively matingly received in the opening of the housing, and an inner surface defining a passageway, and the check valve being coupled to the housing by a first tether;
a cap having an upper end, a lower end, and an outer surface sized and shaped to be selectively matingly received in the passageway of the check valve, and the cap being coupled to the housing by a second tether;
a first pull tab coupled to the first tether;
an orifice in the second tether adjacent to the housing; and
the first pull tab protruding through the orifice in a closed position of the air valve.

21. The inflatable device of claim 20, further comprising the first and second tether being coupled to opposite sides of the housing.

22. An inflatable device, comprising:
an air reservoir;
an air valve sealingly attached to the inflatable device and coupling the air reservoir to a surrounding atmosphere, the air valve comprising:
a housing having an upper end, a lower end, and an opening extending between the upper and lower ends;
a check valve having a body member with an upper end, a lower end, an outer surface sized and shaped to be selectively matingly received in the opening of the housing, and an inner surface defining a passageway, and the check valve being coupled to the housing by a first tether;
a cap having an upper end, a lower end, and an outer surface sized and shaped to be selectively matingly received in the passageway of the check valve, and the cap being coupled to the housing by a second tether;
a first pull tab coupled to the first tether; and
the second tether having an orifice adjacent to the housing and the first pull tab protruding through the orifice in a closed position of the air valve.

* * * * *